United States Patent
Brennenstuhl et al.

(10) Patent No.: US 11,074,275 B2
(45) Date of Patent: Jul. 27, 2021

(54) AUTOMATICALLY PROPAGATING TAGGING OF CONTENT ITEMS IN A CONTENT MANAGEMENT SYSTEM ENVIRONMENT

(71) Applicant: International Business Machines Corporation, Armonk, NY (US)

(72) Inventors: Kai Brennenstuhl, Boeblingen (DE); Timo Kussmaul, Boeblingen (DE); Sven Sterbling, Tuebingen (DE); Klaus Rindtorff, Weil im Schoenbuch (DE); Andreas Stay, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 16/378,918

(22) Filed: Apr. 9, 2019

(65) Prior Publication Data

US 2020/0327149 A1    Oct. 15, 2020

(51) Int. Cl.
   *G06F 16/30*     (2019.01)
   *G06F 16/28*     (2019.01)
   *G06F 16/901*    (2019.01)
   *G06F 16/23*     (2019.01)
   *G06F 16/36*     (2019.01)

(52) U.S. Cl.
   CPC ........ *G06F 16/285* (2019.01); *G06F 16/2365* (2019.01); *G06F 16/2379* (2019.01); *G06F 16/288* (2019.01); *G06F 16/367* (2019.01); *G06F 16/9024* (2019.01)

(58) Field of Classification Search
   CPC ..................................................... G06F 16/367
   See application file for complete search history.

(56) References Cited

U.S. PATENT DOCUMENTS

| 7,107,520 B2 * | 9/2006 | Gargi ...................... G06F 16/51 |
| | | 715/210 |
| 2003/0225792 A1 * | 12/2003 | Schiller ................... G06F 16/40 |

(Continued)

OTHER PUBLICATIONS

Article entitled "Automatic Metadata Generation Using Associative Networks", by Rodriguez et al., dated Feb. 2009.*

*Primary Examiner* — Mehesh H Dwivedi
(74) *Attorney, Agent, or Firm* — Stephen J. Walder, Jr.; Jeffrey S. LaBaw

(57) ABSTRACT

Mechanisms are provided to implement an auto-propagation tagging engine. For a selected first content item in a content item ontology, an auto-propagation metadata tag is retrieved. For the auto-propagation metadata tag a corresponding auto-propagation distance property stored in a corresponding entry, associated with the auto-propagation metadata tag, in an auto-propagation metadata tag mapping data structure is identified. The auto-propagation metadata tag is propagated to a related second content item based on a traversal of the content item ontology. The related second content item is within a distance, in the content item ontology, of the selected first content item corresponding to the auto-propagation distance property. The related second content item is modified to include the auto-propagation metadata tag in content of metadata associated with the related second content item to generate an updated content item which is output to a publishing tool of a content management system for publication.

20 Claims, 6 Drawing Sheets

(56) References Cited

U.S. PATENT DOCUMENTS

| | | | |
|---|---|---|---|
| 2012/0278337 A1* | 11/2012 | Acharya | G06F 16/7844 |
| | | | 707/748 |
| 2015/0064685 A1 | 3/2015 | Goldman et al. | |
| 2015/0161198 A1* | 6/2015 | Clift | G06F 16/58 |
| | | | 707/705 |
| 2016/0179976 A1 | 6/2016 | Piesche et al. | |
| 2017/0048275 A1* | 2/2017 | John | G06F 21/6227 |
| 2017/0270927 A1 | 9/2017 | Brown et al. | |
| 2017/0280099 A1 | 9/2017 | John et al. | |

* cited by examiner

| TAG NAME 210 | AUTO-PROPAGATION DISTANCE 220 | PRIORITY 230 |
|---|---|---|
| CONFIDENTIAL | | |
| CONFIDENTIAL.SECRET | 2 | 2 |
| CONFIDENTIAL.TOP-SECRET | 1 | 1 |

AUTOMATICALLY PROPAGATING TAGGING OF CONTENT ITEMS IN A CONTENT MANAGEMENT SYSTEM ENVIRONMENT

BACKGROUND

The present application relates generally to an improved data processing apparatus and method and more specifically to mechanisms for performing automatically propagating tagging of content items in a content management system (CMS) environment.

A content management system (CMS) manages the creation of digital content items like text documents, web pages, images, videos, code scripts, etc. A CMS typically supports multiple users in a collaborative environment. Modern enterprise-scale content management (ECM) systems are often based on separate content authoring and content delivery systems and thus, different requirements of content creation and retrieval tasks can be met. The responsibility for creating, modifying, and editing content, as well as possibly uploading and importing files, takes place in the authoring system/component and is a process referred to as "authoring." The responsibility for transferring content from the authoring system/component to the delivery system/component takes place in a publishing system/component and is a process referred to as "publishing."

Many CMS provide an authoring user interface for editing and managing content items. Some CMS work as headless CMS in that they do not provide a visual user interface, but instead provide a set of application programming interfaces (APIs) which can be called by client applications to create, edit, and retrieve content items.

The delivery system/component, such as a CDN (content delivery network), publishes content items received from the authoring system/component and received via the publishing system/component, in order to make the content easily available to the public. In some cases, the publishing and delivery system/components may be integrated or considered synonymous with one another. The publishing system/component and/or delivery system/component may also incorporate further functionality like indexing content items in a search index, modifying, transforming, or prerendering content items, etc. Publishing can be either started manually by a content author or can be invoked on a predetermined schedule or through a Publishing API operation.

A CMS provides functionality to define different types of content items. The CMS may provide a predefined list of possible content item types. The type of a content item is, for example, selected by the user in the authoring component. The CMS may represent and store the content item type as a specific field (named e.g. "type", or "classification") in the content item. For example, a CMS may provide these predefined content item types: "content", "asset", "page", "page template". The CMS, and client applications which later retrieve and use the content items, may handle content items of different type separately, e.g., a client application may use a first content item of type "page" to render a view of a page and a second content item of a second type, e.g., "asset" to link a computing resource to the content of the rendered page.

A CMS may be deployed in a cloud environment and is implemented as a set of interacting services. An API gateway may be used to provide an API to client applications, authoring applications, etc. and forward requests and responses between the applications and the CMS services.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to specifically configure the processor to implement a content management system comprising an auto-propagation tagging engine. The method comprises retrieving, by the auto-propagation tagging engine, for a selected first content item in a content item ontology data structure, an auto-propagation metadata tag associated with the selected first content item. The method further comprises identifying, by the auto-propagation tagging engine, for the auto-propagation metadata tag, a corresponding auto-propagation distance property stored in a corresponding entry, associated with the auto-propagation metadata tag, in an auto-propagation metadata tag mapping data structure. In addition, the method comprises propagating, by the auto-propagation tagging engine, the auto-propagation metadata tag to a related second content item based on a traversal of the content item ontology data structure starting with the selected first content item, wherein the related second content item is within a distance, in the content item ontology data structure, of the selected first content item corresponding to the auto-propagation distance property. Moreover, the method comprises modifying, by the auto-propagation tagging engine, the related second content item to include the auto-propagation metadata tag in content of metadata associated with the related second content item to generate an updated content item. Additionally, the method comprises outputting, by the auto-propagation tagging engine, the updated content item to a publishing tool of the content management system for publication of the updated content item to a downstream computing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
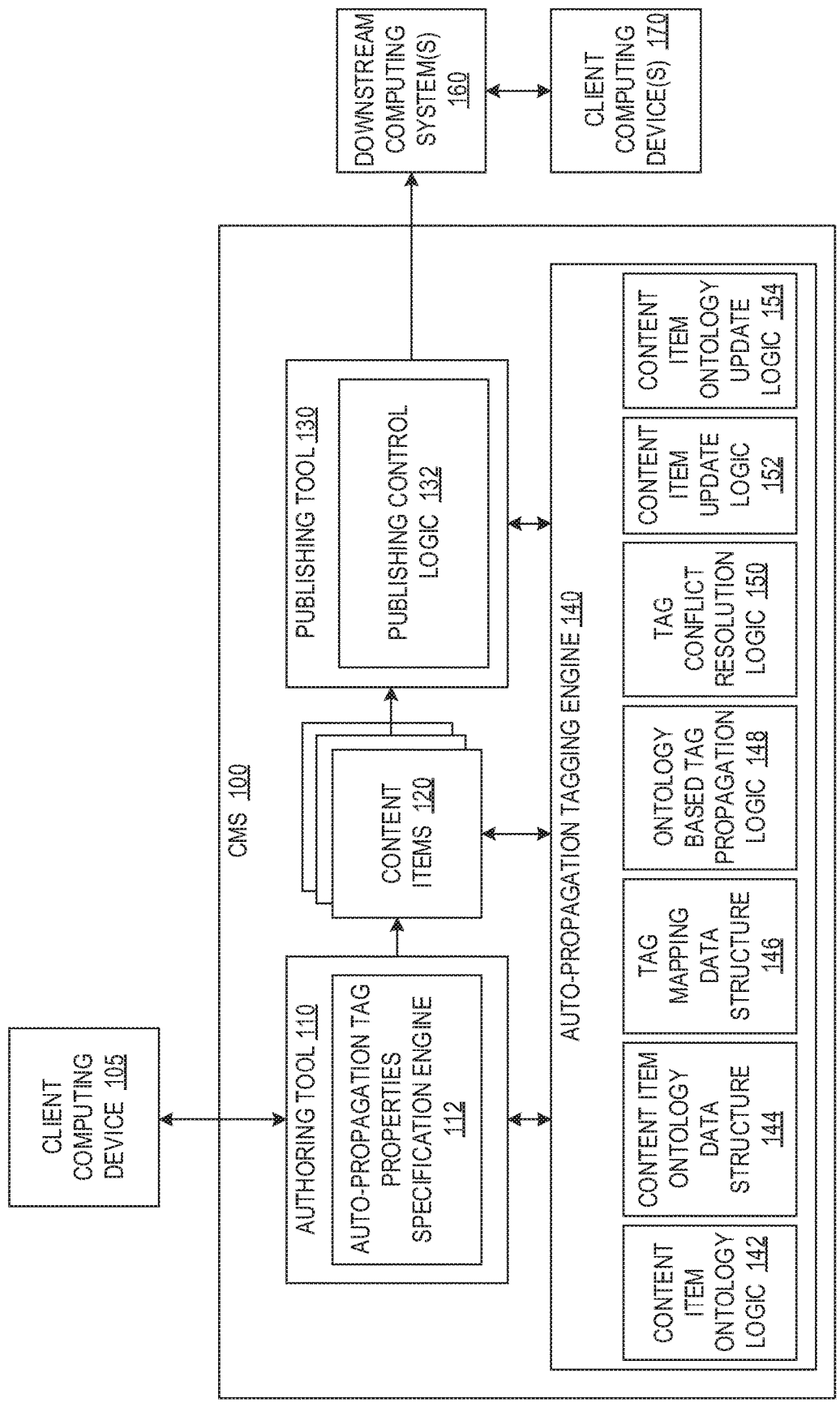
FIG. 1 is an example diagram of the primary operational elements of a content management system (CMS) modified to include an auto-propagation tagging engine in accordance with one illustrative embodiment.

The illustrative embodiments are directed to an improved computing tool, referred to herein as an auto-propagation tagging engine or mechanism, to assist content management systems (CMSs) in managing content items created, managed, and published using their authoring and publication tools. In particular, the illustrative embodiments provide mechanisms for assisting CMSs in tagging, with metadata, content items based on an auto-propagation distance parameter in order to ensure consistent tagging between related content items. Moreover, the illustrative embodiments provide mechanisms for resolving any conflicts that may arise between tags automatically propagated through the auto-propagation tagging engine of the illustrative embodiments.

The result is that content items are properly tagged with appropriate metadata tags that increase the correct functionality of other processes that operate based on the metadata tags. For example, the auto-propagation tagging engine of the illustrative embodiments propagates metadata tags to content items to assist with searching capabilities that operate based on these metadata tags, publishing and/or content distribution operations that are dependent upon or controlled the metadata tags, cognitive computing operations that operate based on the metadata tags associated with content items, such as to generate answers to natural language questions, performing image recognition or classification operations, or the like, and a plethora of other computing operations whose results are at least partially dependent upon what metadata tags are associated with content items.

It should be appreciated that while the illustrative embodiments will be described with an example of a cloud computing based content management system, such as the IBM Watson Content Hub content management system available from International Business Machines (IBM) Corporation of Armonk, N.Y., Box available from Box, Inc. of Redwood City, Calif., Acquia Cloud available from Acquia of Boston, Mass., and the like, the illustrative embodiments are not limited to cloud computing or to the example IBM Watson Content Hub implementation. To the contrary, the mechanisms of the illustrative embodiments may be implemented with any content management system (CMS) in any computing architecture where content items are authored and distributed or made available to users, and in which metadata tags are utilized as a basis for performing other computing operations.

The description of the mechanisms of the illustrative embodiments will make reference to the authoring tools and publishing tools of a CMS. Authoring tools and publishing tools of CMS are generally known in the art and thus, the interfaces and mechanisms for generating content items via authoring tools and publishing content items via the publishing tools of a CMS will not be described herein in detail. For more information regarding such tools, reference is made again to IBM Watson Content Hub which includes such tools, as a non-limiting example of such authoring tools and publication tools. The present description focuses on the improvements to these authoring tools, publishing tools, and the addition of a new auto-propagation tagging engine that operates in conjunction with the authoring tools and publishing tools, either in parallel with the authoring and publishing tools, or otherwise executed on the outputs and inputs to these tools.

Often when authoring content items via the authoring tools of a content management system (CMS), the author adds metadata tags to the content items to assist the CMS and other automated tools in performing operations on the content items, such as performing searches, performing content publication operations, performing cognitive computing operations on content items, or the like. However, the adding of metadata tags to content items, e.g., web pages, documents, multi-media content, or any other digital collection of content, is a manual process requiring the human user to determine what metadata tags to include and with which content items to include the metadata tags. Reliance on manual processes leads to a possibility of human error and inconsistency which can be problematic for the correct operation of downstream computing operations that rely upon the metadata tags for their operations to be performed correctly.

For example, in a case in which a metadata tag represents a security level for publication of a content item, e.g., "top secret", "secret", "confidential", etc. or a metadata tag representing a restriction on publication of the content item, e.g., "do not publish before X", a human user may author a content item that is related to other content items and may apply a metadata tag to the content item, but fail to apply the same metadata tag to other related content items. This can be problematic, especially in cases of security and publication controls, where the failure to be consistent in the metadata tagging of related content items may result in downstream computing operations providing access to related content items that should not be accessed, or publishing content items that should not be published, if they were consistently tagged. Due to human error and the increasing complexity of content being authored and published via CMS mechanisms, the likelihood of such situations is becoming more prevalent in modern computing systems.

The illustrative embodiments provide mechanisms for automatic propagation (auto-propagation) metadata tags, i.e. predefined metadata labels for describing a portion of content or for defining controls on the processing of portions of content, from projects or content items to other related content items or projects managed by a content management system (CMS). The illustrative embodiments utilize a tag mapping data structure that maps a predefined set of metadata tags (or simply referred to as "tags" herein) to distance parameter values, metadata tag priorities, and/or other properties corresponding to the metadata tag that may be used to perform automated propagation of metadata tags and conflict resolution in the propagation of the metadata tags. Moreover, the illustrative embodiments operate on a content item ontology data structure to perform such automatic propagation of the metadata tags based on the particular organization of projects and content items with regard to their relationships to other projects and content items. The content item ontology data structure comprises nodes representing projects, content items, and other objects representing an organization of content and corresponding metadata, with edges between the nodes representing relationships between these objects.

In the context of the present description, a project is any grouping or collection of content items that are related to each other. When a content item is created via a CMS authoring tool, for example, the content item may be either manually assigned to a project by the human author via a user interface of the CMS authoring tool, or may be automatically assigned to a project based on its attributes, such as by automatically executed content item grouping logic. A content item may consist, for example of a document (e.g., a document containing textual and/or graphical or even multimedia content) or binary data (e.g., an image file, video file, audio file, or other mixed media data structure). One content item can belong to a set of projects. Also, in some illustrative embodiments, a project can comprise a set of other projects resulting in a hierarchical project structure. Since each content item is an instance of a content type, the content type may be defined with particular attributes such as plain or rich text, toggles, timestamp, video, file, link, location, reference to other content items, etc. which may serve as a basis for automated grouping of related content items into projects or content item groupings.

Content item grouping logic, which may execute various types of content item grouping rules on different attributes or combinations of attributes, may be employed by the content item authoring and/or publishing tools of the CMS, to automatically group content items with related content items based on these attributes. For example, a content type may have an attribute corresponding to a geographical location with which the content is associated. A content item grouping rule may be executed by the CMS tools to group content items based on similar geographical location attributes and thereby generate projects or groupings of content items that have similar geographical location attributes, for example.

Another example type of grouping that may be implemented by content item grouping logic may be to group content items based on tags which are given to the content items. These tags can be either assigned manually, i.e. by the content author, or by running cognitive algorithms on the content item to classify the content item into a category for tagging with a corresponding tag or label, e.g., performing an image recognition operation using image recognition logic if the content item contains an image element. A further example grouping operation that may be performed by content item grouping logic may be using a product category (e.g., hierarchical product categories, e.g., "apparel" and "apparel/men", "apparel/men/shirts", etc., or brand, size, color, etc. for example for a product catalog It should be appreciated that any content type attributes, or combinations of content type attributes, may be operated on by content grouping logic and/or rules to determine projects or groupings of related content items.

The organization of related content items is represented as a content item ontology data structure in which projects and content items are represented as nodes and edges define the relationships between the content items. Content items may be related to projects and/or other content items, projects may be related to other projects, and so on. For example, a project may have one or more content items associated with it in the content item ontology data structure. That project may be related to one or more other projects. Content items may be related to multiple different projects. Moreover, in some cases, content items may be related to other content items in a hierarchical dependency, e.g., one content item may reference or be linked to another content item, e.g., a hyperlink between content items present in content of one of the content items, such that an edge may exist between one content item and another content item. The relationships may be automatically identified through the content grouping logic and/or rules and/or manually specified by a human author. Manual specification of relationships may override automated determinations of relationships.

In addition, in accordance with the illustrative embodiments, the content item authoring tool of a CMS is improved to include mechanisms for specifying tag auto-propagation properties, such as an auto-propagation distance property and, in some illustrative embodiments, priorities between tags for use in performing conflict resolution. In some illustrative embodiments, tags may be given a tag type as well, such that tags of a same tag type may be evaluated for conflicts based on priorities or other properties of individual instances of the tags. The resulting tag mapping data structure maps metadata tags to corresponding auto-propagation distance parameters and potentially priorities and tag types.

An auto-propagation tagging engine, which may execute in parallel with the authoring tool and publishing tool of the CMS, or may operate on the output of the authoring tool and the input to the publishing tool, provides logic for automatically propagating tags from one project and/or content item to other related projects and/or content items in accordance with the auto-propagation distance parameters, priorities, and/or other conflict resolution properties. Moreover, the auto-propagation tagging engine, in some illustrative embodiments, provides a mechanism for updating the metadata of content items to include or remove tags and a mechanism to modify the content item ontology based on conflict resolution actions.

In one illustrative embodiment, the auto-propagation tagging engine comprises content item ontology logic that generates and/or updates a content item ontology for content items authored via the authoring tool of the CMS. That is, as content items are authored via the authoring tool, a human author may express through a project that a grouping of content items are related. Since projects can be nested it is possible that projects may be hierarchically related to other projects, e.g., a website may be the parent project while individual smaller projects, e.g., billing department content items, sales department content items, etc., may constitute individual nested projects within a parent project of a company website. Within these projects and their relationship to one another, the content item ontology logic may generate nodes for content items and/or projects to which content items are grouped, along with edges between these nodes indicating relationships between the content items.

The generation of the content item ontology may be done dynamically as new content items are authored via the authoring tool, or may be done after the fact, such as at a later time after a content item has been authored and added to a project. For example, when a content item is created via the authoring tool of the CMS, the human author may manually assign the content item to a project and the content item may have a content item type. Alternatively, as noted above, when the human author creates the content item, the content item will have particular attributes which may be specified by the human author or automatically generated by the authoring tool. These attributes may be operated on by the content item ontology logic of the auto-propagation tagging engine to automatically generate a node for the content item and link it, via edges, to other nodes in the ontology having similar attributes. For example, the triggering of such a process may be in response to the human author selecting an operation via the authoring tool, such as a store or save operation indicating a desire to maintain the content item as part of a project. Alternatively, at a later time after the content item has been stored, the content item ontology logic of the auto-propagation tagging engine may scan all stored content items and generate for each project, a content item ontology for the parent project. In generating the ontology, content items may be automatically combined into projects based on their similarities in properties in accordance with ontology generation logic or rules implemented by the content item ontology logic. For example, this alternative operation may be initiated in response to a command to publish a content item or project via the publishing tool of the CMS.

The nodes of the resulting content item ontology data structure for a group of projects may be analyzed by ontology based tag propagation logic based on the tag mapping data structure to propagate metadata tags from content items and/or projects to other related content items and/or projects. That is, a content item in the content item ontology data structure may be selected for tag propagation. Each of the metadata tags associated with the selected content item are then mapped to a corresponding auto-propagation distance value for the metadata tag based on the tag mapping data structure, or a default auto-propagation distance value, e.g., 0, if one is not specified in the tag mapping data structure. The auto-propagation distance value indicates a distance within the ontology to which the tag will be propagated, either in terms of edges traversed, nodes, projects traversed, or the like. For example, in one illustrative embodiment, a metadata tag of "secret" with a corresponding auto-propagation distance value of "2" may be provided where the auto-propagation distance is defined in terms of number of related projects (i.e. projects connected by edges) to which the metadata tag is to be propagated. In this case, an auto-propagation distance value of "1" means that content items that are part of the same project as the selected content item will have the metadata tag propagated to them. An auto-propagation distance value of "2" means that content items in the same project and related projects one edge away from the current project will have the metadata tag "secret" propagated to their content items. The same may be defined for content item nodes in terms of numbers of edges, e.g., an auto-propagation distance of "2" may specify content item nodes that are two or less edges away from a selected content item node. Using a nodal auto-propagation distance value, the numeric value specifies how many nodes distance from the current selected node, i.e. the node corresponding to the selected content item, to which to propagate the metadata tag, e.g., a distance of "2" means any nodes that are two nodes away or less.

Thus, for each metadata tag of the selected content item, the ontology based tag propagation logic of the CMS traverses the ontology, i.e. the nodal graph of the ontology, starting from the selected content item, to nodes corresponding to the metadata tag's auto-propagation distance value. In some illustrative embodiments, all possible neighbors are considered during this traversal such that if a node has multiple neighbors, the tag and auto-propagation distance value are multiplied and propagated to all neighbors, excluding the one from which the metadata tag just arrived from. During traversal of the ontology, in some illustrative embodiments, the auto-propagation distance value is decremented after each step. Thus, as an example, for an auto-propagation distance value of 1, the metadata tag is propagated to each direct neighbor, such as a parent node. For an auto-propagation distance value of 2, the metadata tag may be propagated to each parent and each grandparent, and/or the parent and sibling nodes. The metadata tag is assigned to the content items of each node traversed. The metadata of content items to which the metadata tag is to be propagated are updated by a content item tag update logic of the auto-propagation tagging engine. This process may be repeated for each metadata tag of the selected content item and for each subsequently selected content item until all metadata tags, determined to be auto-propagation metadata tags, for all selected content items of the ontology are propagated.

During propagation, conflicts between metadata tags of different content items and/or projects may occur. Tag conflict resolution logic may be utilized to identify such conflicts and perform actions to resolve such conflicts. The tag conflict resolution logic may apply heuristics for identifying and resolving conflicts which may operate based on groupings of metadata tags by a tag type. For example, a tag type may be of the type "security" with metadata tags of "top secret", "secret", "confidential", "private", etc. Another metadata tag type may be "publish time" with a metadata tag of "do not publish before X" or "publish after Y". Metadata tags within the same tag type may be considered potentially conflicting of one another. Thus, the tag conflict resolution logic may identify conflicts when a content item is assigned more than one metadata tag of a same tag type.

In one illustrative embodiment, the conflict resolution logic may resolve this conflict according to establish priorities associated with the metadata tags in the tag mapping data structure. For example, a content item author, or an authoring authority may define priorities to metadata tags indicating which metadata tags take precedent over other metadata tags when there is a conflict. For example, with regard to the "security" type metadata tags, priorities may be associated with the metadata tags such that "top secret" supersedes "secret", which supersedes "confidential", and so on. Thus, if a content item has both a "secret" and "top secret" metadata tag assigned to it, the "top secret" metadata tag will overwrite or supersede the "secret" metadata tag. Based on the conflict resolution, the final set of metadata tags after conflict resolution is performed may be used as a basis for continuing the propagation of metadata tags to neighboring nodes and their projects or content items.

It should be appreciated that alternative to, or in addition to, the specification of priorities with metadata tags, other properties of the content items and conflicting metadata tags may be used as a basis for resolving any conflicts in the metadata tags. For example, a time/date associated with the metadata tags may be used to resolve conflicts such that the more recent metadata tag may overwrite or supersede the older metadata tag. Of course, more complex evaluations that look to a combination of properties, priorities, and the like may be used without departing from the spirit and scope of the present invention. For example, properties of the content item (selected content item) from which a metadata tag was propagated, i.e. an originating content item, may be evaluated and compared to properties of the content item to which the metadata tag is being propagated to determine whether to utilize the propagating metadata tag or a metadata tag already associated with the content item. For example, if the metadata tag is being propagated from a content item that is in a different geographical location, different organizational entity, has a different content subject matter, or the like, than the content item to which the metadata tag is being propagated, then it may be more beneficial to maintain the already present metadata tag and discard the propagating metadata tag. Various heuristics and conflict resolution rules or logic may be implemented of various levels of complexity without departing from the spirit and scope of the present invention.

In some illustrative embodiments, as a result of the metadata tag propagation and conflict resolution, it is possible that projects and content items may have different and potentially conflicting metadata tags, e.g., an unrestricted project may have a restricted content item present within the project. In such cases, of conflicts within the ontology structure, content item ontology update logic of the CMS may automatically modify the ontology to resolve the conflict. For example, a content item may be removed from a project, a sub-project may be created and the content item moved to the sub-project, or other suitable actions to ensure consistency between projects and content items associated with those projects is maintained.

The updated content items and content item ontology data structures may be provided to the publishing tool of the CMS for publishing in accordance with publishing controls and publishing logic. The publication control logic of the publishing tool may operate on the metadata tags associated with the content items to control the manner by which the content items are published, such as via a content delivery network (CDN). A CDN is a geographically distributed set of computing resources, e.g., servers, databases, network devices, etc., which work together to provide fast delivery of content over a distributed computing network, allowing for quick transfers of assets for loading content, such as web pages, Javascript files, image files, video files, stylesheets, etc.

The published content items may be accessed by other downstream computing systems such that their computing operations may be performed on the content items. Such downstream computing system operations may be wholly or partially based on the metadata tags associated with the content items. For example, some downstream computing system operations that may make use of metadata tags associated with content items include, but are not limited to, search engines performing searches based on metadata tags, cognitive computing systems performing cognitive evaluations of content items by analyzing metadata tags associated with the content items, such as generating answers to natural language questions, performing image recognition operations, or the like, controlling content item access by other processes or users, and the like.

Thus, the illustrative embodiments provide mechanisms in a content management system (CMS) for automatically propagating metadata tags between content items that are related to one another. The mechanisms of the illustrative embodiments utilize auto-propagation distance values to control the proliferation of the metadata tags through the content item ontology and resolves conflicts between metadata tags that may occur as a result of the propagation. Thus, rather than relying on manual tagging by content item authors, the illustrative embodiments provide improved computing tool mechanisms to automatically determine which content items should have which metadata tags, thereby providing greater assurances that content items will be consistent in their metadata tags and improving the accuracy of the downstream computing operations that are performed based on the metadata tags associated with the content items.

Before continuing the description with reference to the figures, it should be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, JavaScript, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example diagram of the primary operational elements of a content management system (CMS) modified to include an auto-propagation tagging engine in accordance with one illustrative embodiment. As shown in FIG. 1, the CMS 100 comprises an authoring tool 110 that content authors, via their client computing devices 105, may utilize to author content items via one or more user interfaces and logic provided in the authoring tool 110 in a manner generally known in the art. The content items 120 generated via the authoring tool 110 may be published for consumption by content users and other downstream computing systems 160 via the publishing tool 130 of the CMS 100. Again, the publishing tool 130 operates to publish content items in a manner generally known in the art. As an example, the CMS may be an instance of the IBM Watson Content Hub, including its authoring tool and publishing tool, which is augmented to include the mechanisms of the illustrative embodiments as described herein.

As shown in FIG. 1, the CMS 100 is augmented to include an auto-propagation tagging engine 140 that operates in conjunction with the authoring tool 110 and publishing tool 130 on the content items 120 to automatically perform tag propagation to related content items and/or projects to ensure proper publishing controls/operations, control over content distribution via content delivery networks (CDNs), and ultimately proper downstream computer operations on the content items based on the metadata tags associated with the content items. In the depicted example illustrative embodiment, the auto-propagation tagging engine 140 comprises content item ontology logic 142 which operates on content items 120 to generate a content item ontology data structure 144 for projects. It should be appreciated that different ontology data structures may be generated for different project structures. As noted previous, project structures may comprise one or more projects and projects may be nested in a hierarchical manner such that one project may be part of or related to another project. The resulting topology is that of a graph with nodes representing projects and/or content items, and edges depicting the relationships between projects and between content items within and between projects.

When traversing this topology for purposes of propagating metadata tags, as described herein, an example utilizing edge counting is described, however the illustrative embodiments are not limited to such. It should be apparent to those of ordinary skill in the art in view of the present description that other traversal techniques may be utilized without departing from the spirit and scope of the illustrative embodiments, as touched upon previously. For example, the edge-counting traversal may be replaced with a node-counting traversal methodology, where the node counting traversal methodology may include or exclude the start and stop nodes depending on the desired implementation.

It should also be appreciated that while FIG. 1 shows the content item ontology logic 142 and content item ontology data structure 144 being part of the auto-propagation tagging engine 140, the content item ontology logic 142 may alternatively be associated with the authoring tool 110 or publishing tool 130. For example, in one illustrative embodiment, the content item ontology logic 142 may be integrated with the authoring tool 110 and may dynamically operate on content items authored by the authoring tool 110 to generate and update a content item ontology data structure 144. For example, as new content items are authored and generated by the authoring tool 110, the content items may be added to the ontology data structure 144 based on analysis performed by the content item ontology logic 142 to determine project associations and related content items/projects.

Again, as shown in FIG. 1, the authoring tool 110 is augmented to include an auto-propagation tag properties specification engine 112. The auto-propagation tag properties specification engine 112 provides an interface and logic whereby an author of content items may specify which metadata tags are auto-propagation metadata tags and what their auto-propagation properties are. The auto-propagation properties may include, for example, an auto-propagation distance value, a priority, and/or other properties that are to be used in resolving conflicts between propagated metadata tags and other metadata tags associated with content items. The auto-propagation tag properties specification engine 112 operates to generate a tag mapping data structure 146 that is maintained by the auto-propagation tagging engine 140 for use in performing metadata tag propagation and conflict resolution based on a content item ontology data structure 144 generated/maintained by the content item ontology logic 142.

The entries in the tag mapping data structure 146 may be defined by content authors and/or other authorized users associated with the content items. For example, some entries may be predefined by authorized users such that they are applicable to all content items associated with a particular entity, e.g., government or business organization. These may be considered a type of fixed auto-propagation metadata tag entry in the tag mapping data structure 146. Other entries in the tag mapping data structure 146 may be generated by content authors as they deem appropriate, but may be applicable to a subset of the entity, e.g., government or business organization, e.g., a department within an organization may utilize a particular metadata tag while other departments may not. It should be appreciated that different tag mapping data structures 146 may be established for different entities, or subsets of entities.

Figures 2, 5:
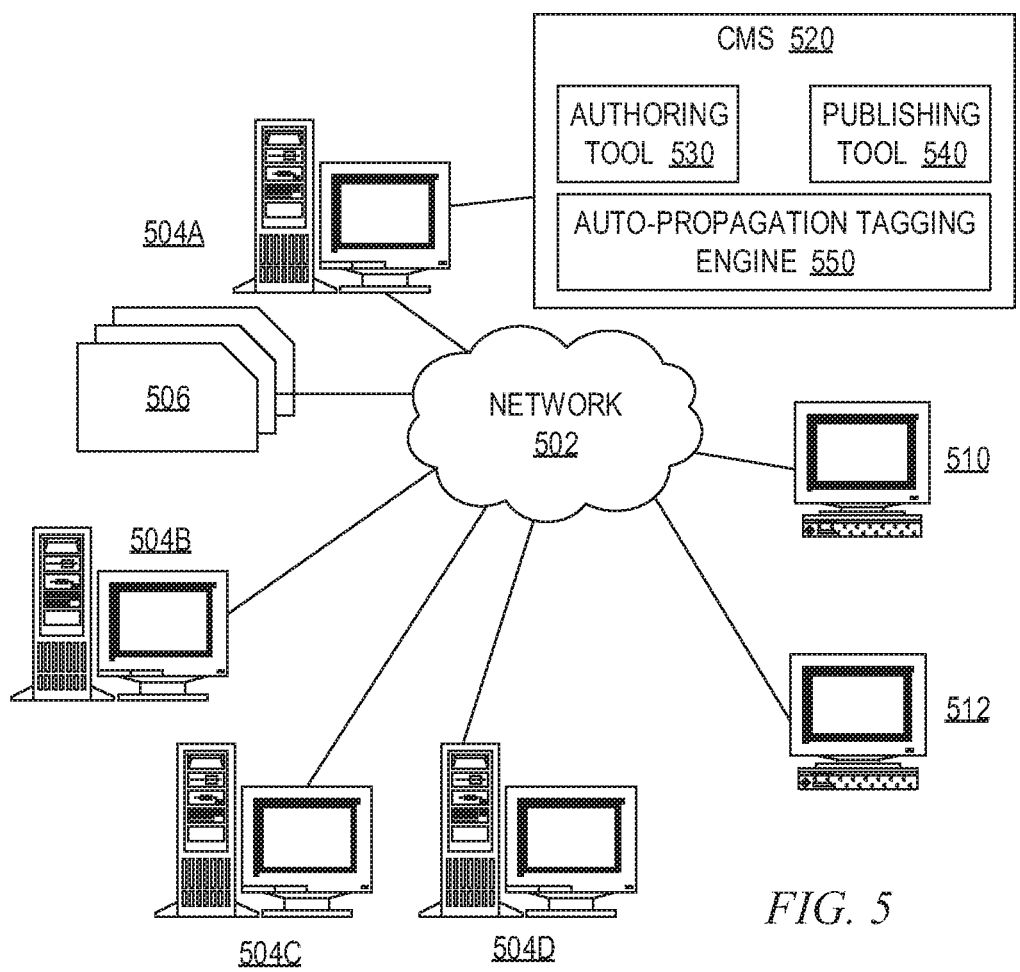
FIG. 2 is an example diagram of an auto-propagation tag mapping data structure in accordance with one illustrative embodiment.
FIG. 5 is an example diagram of a distributed data processing system in which aspects of the illustrative embodiments may be implemented.

FIG. 2 is an example diagram of an auto-propagation tag mapping data structure in accordance with one illustrative embodiment. FIG. 2 shows an auto-propagation tag mapping data structure for a single category of tags or tag type. It should be appreciated that different auto-propagation tag mapping data structures may be generated for different tag categories or tag types. Alternatively, a single auto-propagation tag mapping data structure may be generated for a plurality, or all, auto-propagation tags of a various types/categories and an additional entry field may be added that specifies the tag type or tag category so that conflict resolution may be performed, as described herein.

As shown in FIG. 2, in the depicted example illustrative embodiment, each entry in the auto-propagation tag mapping data structure comprises a tag name field 210, an auto-propagation distance field 220, and a priority value field 230. The content of these fields 210-230 may be manually populated by a content author, another authorized individual, or may otherwise be predefined. When a content item is authored via the authoring tool, the properties of the project under which the content item is authored are associated with the content item and thus, the corresponding metadata tags which may include corresponding auto-propagation metadata tag attributes as specified in the auto-propagation tag mapping data structure. It should be appreciated that automated tools, such as natural language processing tools, may also operate on the content of the content item to automatically classify the content of the content item and assign corresponding metadata tags based on the classification. These automated tools may process such content items in response to an authoring tool performing an operation to store or save the content item, for example, or any other suitable triggering operation. Such automated tools may operate in conjunction with a user utilizing the authoring tool to author the content item such that an author may create the content item and invoke the operation of the automated tool in response to a command to store or save the content item that was authored, for example.

As shown in FIG. 2, the tag name field 210 is used to match to metadata tags added to content items so that the corresponding auto-propagation properties in the other fields of the entries may be retrieved for a particular set of metadata tags associated with a content item. The auto-propagation distance field 220 provides auto-propagation distance values to be used when propagating the corresponding metadata tag from a selected content item or project to other related content items and/or projects. The priority field 230 is used by conflict resolution logic to resolve conflicts arising between metadata tags due to the propagation of metadata tags from content items or projects to related content items or projects. Additional fields may be provided depending on the desired implementation, e.g., the tag type field, fields specifying content item or project properties to be used in resolving conflicts, etc.

Returning to FIG. 1, the auto-propagation tagging engine 140 further comprises ontology based tag propagation logic 148 that operates to perform the auto-propagation tag propagation from content item and/or project to related content items/projects based on the content item ontology data structure 144 and tag mapping data structure 146. That is, as mentioned previously, the content item ontology data structure 144 is comprised of nodes and edges where each of the nodes represent projects or content items. Content items may be associated with projects manually or based on similarities of attributes of the content items, such as a geolocation of the content items, subject matter of the content items, organization or sub-organization entity authoring the content item, or the like. From the organization of the content items based on their properties and manual specifications of relatedness to one another via association with projects, the content item ontology data structure 144 is generated by the content item ontology logic 142 to represent what content items and/or projects are related to one another and how via the linkage of nodes and edges.

The nodes of the resulting content item ontology data structure for an overall project may be analyzed by the ontology based tag propagation logic 148 based on the tag mapping data structure 146 to propagate metadata tags from content items and/or projects to other related content items and/or projects by traversing the ontology 144 and applying the auto-propagation distance value specified in the tag mapping data structure 146 to metadata tags matching metadata tag names in the tag mapping data structure 146. That is, a content item in the content item ontology data structure 144 may be selected for tag propagation. This may be a content item authored by an author via the authoring tool 110 and being added to the ontology 144, a content item that is submitted for publication via the publishing tool 130, or a content item selected by an automated mechanism that operates on the ontology 144 in an iterative manner traversing each content item and project in the ontology 144 to perform metadata tag propagation prior to the content items of the ontology 144 being published via the publishing tool 130 of the CMS 100, for example.

Each of the metadata tags associated with the selected content item are mapped to a corresponding auto-propagation distance value for the metadata tag based on the tag mapping data structure 146, or a default auto-propagation distance value, e.g., 0, if one is not specified in the tag mapping data structure 146. For example, metadata tags associated with the selected content item, but which have no matching entry in the tag mapping data structure 146, may be given an auto-propagation distance value of 0, meaning that these metadata tags will not be propagated using the auto-propagation tagging mechanisms of the illustrative embodiments. Similarly, in some illustrative embodiments, if there is no matching entry in the tag mapping data structure 146 for a metadata tag, the metadata tag will simply be skipped during the auto-propagation tag propagation operation of the ontology based tag propagation logic 148.

For each metadata tag of the selected content item, the ontology based tag propagation logic 148 of the CMS 100 traverses the ontology 144, i.e. the nodal graph of the ontology 144, starting from the node corresponding to the selected content item, to nodes corresponding to other content items/projects up to the metadata tag's auto-propagation distance value. Again, in some illustrative embodiments, all possible neighbors are considered during this traversal such that if a node has multiple neighbors, the tag and auto-propagation distance value are multiplied and propagated to all neighbors, excluding the one from which the metadata tag just arrived from. There are different approaches that may be used to count the auto-propagation tag distance as discussed previously, with the illustrative approach used in the examples set forth herein being an edge counting approach. During traversal of the ontology 144, the contiguous distance value is decremented by the ontology based tag propagation logic 148 after traversing each edge until the value reaches 0. The metadata tag is assigned to the content items of each node connected to an edge traversed and updated by the content item tag update logic 152 of the CMS 100. This process may be repeated for each metadata tag of the selected content item, and for each subsequently selected content item until all metadata tags, determined to be auto-propagation metadata tags, for all selected content items of the ontology 144 are propagated.

The tag conflict resolution logic 150 operates during propagation of the auto-propagation metadata tags to identify and resolve conflicts between metadata tags of different content items and/or projects. The tag conflict resolution logic 150 may apply heuristics for identifying and resolving conflicts which may operate based on groupings of metadata tags by a tag type or tag category as previously described above. Thus, the tag conflict resolution logic may identify conflicts when a content item is assigned more than one metadata tag that are of a same tag type or category.

In one illustrative embodiment, the tag conflict resolution logic 150 may resolve this conflict according to established priorities associated with the metadata tags in the tag mapping data structure 146, such as priorities 230 in FIG. 2. It should be appreciated that such conflict resolution may be performed both with regard to auto-propagation tags and non-auto-propagation tags. In some illustrative embodiments, if a tag does not have an associated priority, other properties of the content item or project may be utilized as a basis for performing conflict resolution, such as date/time that the tag was created/applied to the content item or project. In some illustrative embodiments, if a tag does not have an associated priority, it may be given a lowest possible priority. If a conflict cannot be resolved, i.e. it cannot be determined which tag should be maintained, a notification to a human analyst or other authorized person may be generated and output so that the human analyst or authorized person may resolve the conflict. Based on the conflict resolution, the final set of metadata tags, after conflict resolution is performed may be used by the ontology based tag propagation logic 148 as a basis for continuing the propagation of metadata tags to neighboring nodes and their projects or content items in the ontology 144. In addition to, or alternative to the priority based conflict resolution, other properties of the content items and conflicting metadata tags may be used as a basis for resolving any conflicts in the metadata tags, as previously discussed above.

In some illustrative embodiments, as a result of the metadata tag propagation and conflict resolution, it is possible that projects and content items may have different and potentially conflicting metadata tags. The content item ontology update logic 154 of the CMS 100 analyzes the content items and projects of the content item ontology data structure 144 after propagation of the metadata tags is performed and the metadata tags associated with the projects and content items are compared to identify any inconsistencies between projects and content items associated with those projects. For example, a content item may be removed from a project when one or more metadata tags associated with the content item are inconsistent or conflict with metadata tags associated with a project with which the content item is associated. The content item may be associated with a different project with which the metadata tags are consistent or do not conflict. In some illustrative embodiments, a sub-project may be created having metadata tags consistent with the removed content item, and the content item may be moved to the sub-project to thereby associate the content item with the new sub-project. Of course, other suitable actions may be performed by the content item ontology update logic 154 to modify the ontology 144 to ensure consistency between projects and content items associated with those projects is maintained.

The updated content items 120 and content item ontology data structures 144 may be provided to the publishing tool 130 of the CMS 100 for publishing in accordance with publishing control logic 132. The publication control logic 132 of the publishing tool 130 may operate on the metadata tags associated with the content items 120 to control the manner by which the content items 120 are published, such as via a content delivery network (CDN). The published content items may be accessed by other downstream computing systems 160 such that their computing operations may be performed on the content items. Such downstream computing system operations may be wholly or partially based on the metadata tags associated with the content items. For example, some downstream computing system 160 operations that may make use of metadata tags associated with content items include, but are not limited to, search engines performing searches based on metadata tags, cognitive computing systems performing cognitive evaluations of content items by analyzing metadata tags associated with the content items, such as generating answers to natural language questions, performing image recognition operations, or the like, controlling content item access by other processes or users, and the like. The operation of the downstream computing system 160 may be with regard to requests from, or other interactions with, client computing devices 170 that operate to utilize the computing services of the downstream computing system 160.

Figure 3:
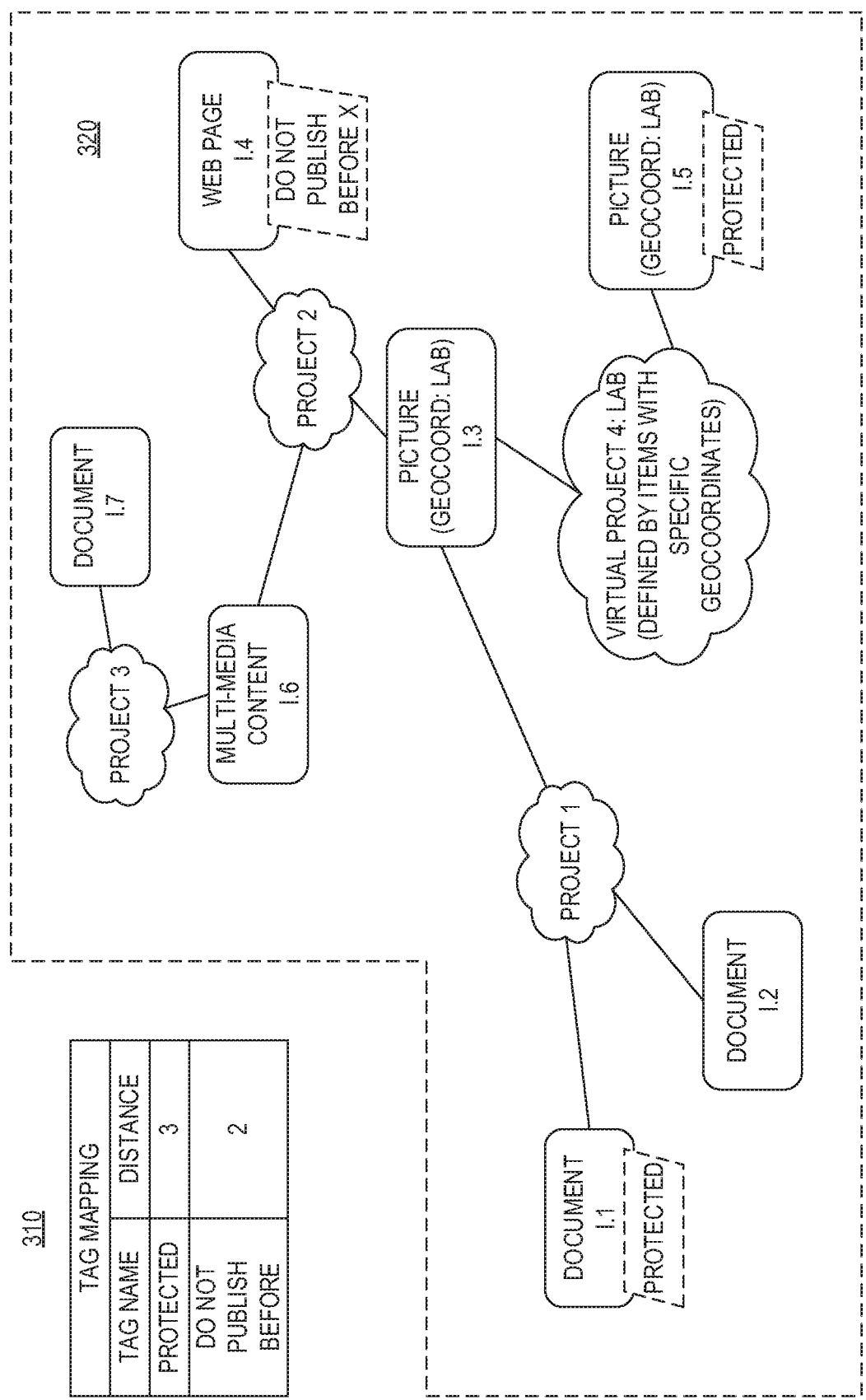
FIG. 3 is an example diagram illustrating an example operation of auto-propagation tag propagation in accordance with one illustrative embodiment.

To further illustrate the operation of the auto-propagation tagging engine, FIG. 3 provides an example diagram illustrating an example auto-propagation tag propagation in accordance with one illustrative embodiment. In the example of FIG. 3, a tag mapping data structure 310 and a metadata tag ontology data structure 320 representation are shown. As shown in FIG. 3, objects corresponding to content items are referenced by an "i.x" label where x is a numerical value assigned for reference purposes in this example. Nodes corresponding to projects or groupings of content items are shown as cloud icons for differentiation from the nodes corresponding to content items. A project in the depicted example represents a collection of content items that one or more human authors have indicated are specifically associated or related to one another. A "virtual" project is a project that is generated automatically to represent a collection of content items that have one or more similar attributes, e.g., a geolocation attribute. For example, virtual project 4, i.e. the "lab" virtual project, in FIG. 3 comprises content items that all have the same geolocation attribute of "geocoordinates:lab", i.e. content items i.3 and i.5 (which are picture content items) in the depicted example.

As can be seen in FIG. 3, content items may be associated with one or more projects and/or virtual projects, and projects/virtual projects may be associated with each other via common content items, e.g., project 1 is associated with project 2 via content item i.3. For example, content item i.3 is associated with project 1, project 2 and virtual project 4 in the depicted example. Although not shown in FIG. 3, it should be appreciated that projects/virtual projects may be associated with other projects/virtual projects directly, such as via a project-subproject relationship, such as in a nested manner as previously described above. All relationships in the ontology 320 are represented as edges in the graph depiction.

The tag mapping data structure 310 comprises entries for each of the metadata tags that an author and/or other authorized person regards as an auto-propagation metadata tag that is to be propagated from a content item or project to other related content items and/or projects. In the depicted example, the tag mapping data structure 310 comprises entries in which two fields are provided, i.e. a tag name field and a corresponding auto-propagation distance field. In the tag mapping data structure 310 of the provided example, the metadata tag "protected" is defined as an auto-propagation tag with an auto-propagation distance value of 3 and the metadata tag "do not publish before" is defined with an auto-propagation distance value of 2. In the depicted example, content item i.1 is tagged with the metadata tag "protected" and item i.4 is tagged with the metadata tag "do not publish before." In addition, item i.5 is tagged with the metadata tag "protected." Moreover, all content items having a defined geolocation attribute of "geocoordinates:lab" are linked to the virtual project 4.

Based on the tag name, metadata tags associated with content items and/or projects of the ontology 320 are matched to the corresponding auto-propagation distance value in the tag mapping data structure 310, which is then used to propagate the metadata tag to other content items and/or projects. In the depicted example, content item i.1 is already tagged with "protected" which has an auto-propagation distance value of 3. As a result, the "protected" metadata tag is propagated from content item i.1 to content item i.2 (in the approach of counting edges this is an edge distance of 2). For purposes of illustration, the present description of an example illustrative embodiment omits an approach where the propagation of the auto-propagation metadata tags includes propagation to the project nodes. However, depending on the actual propagation strategy selected for the particular implementation, it is a valid approach to also propagate auto-propagation metadata tags to projects and/or virtual projects as well. In the depicted example, in addition to the above propagation, the "protected" metadata tag is propagated from content item i.1 to content item i.3 (distance 2, when counting the edges).

Content item i.6 and content item i.4 do not receive the tag "protected" because when counting the edges in the graph 320, content items i.6 and i.4 are 4 edges away from content item i.1 and content item i.5, which is also tagged with "protected". If the auto-propagation distance of the tag "protected" were changed to be an auto-propagation tag distance of 4, then content items i.4 and i.6 would have also had the auto-propagation tag "protected" propagated to them.

A similar propagation is performed with regard to the metadata tag "do not publish before" when the content item i.4 is selected as an origin content item for metadata tag propagation. In this case, the "do not publish before" metadata tag is propagated using the auto-propagation distance value of 2 such that content items i.4 starts with the "do not publish before" metadata tag and it is propagated to content items i.3 and i.6. The content item i.7 is not modified through the propagation of metadata tags as its distance is beyond the auto-propagation distance values defined for the metadata tags in the tag mapping data structure 310.

As noted previously, various approaches may be utilized for propagating the auto-propagation tag using an auto-propagation tag distance. While the depicted example uses an edge counting approach in which projects/virtual projects are not targets of the propagation, i.e. only content item nodes are considered, in other illustrative embodiments propagation to the project/virtual project nodes is also a possible implementation. For example, in such an embodiment, when still using the edge count mechanism, the end tags would be propagated to the end nodes as well, however, the tagging of the end nodes does not decrease the tag distance, i.e. only when traversing an edge is the auto-propagation distance reduced. Using the example shown in FIG. 3, this would result in the following propagation of auto-propagation metadata tags. Project 1 is tagged with "protected" because it is one edge away from content item i.1 and the auto-propagation metadata tag "protected" has an auto-propagation distance of 3. Project 2 is tagged with "protected" as well, because it is 3 edges way from both content item i.1 and content item i.5, which are both tagged with "protected". In addition, project 2 is tagged with "do not publish before" because it is one edge away from content item i.4. Project 3 remains untagged because it is not within the auto-propagation tag distance of "protected" or "do not publish before". Virtual project 4 is tagged with "protected" because it is only one edge away from content item i.5. The tag "do not publish before" is not propagated to virtual project 4 because content item i.4 is three edges away and, according to the auto-propagation metadata tag mapping data structure 310, the auto-propagation distance for this tag is 2.

Figure 4:
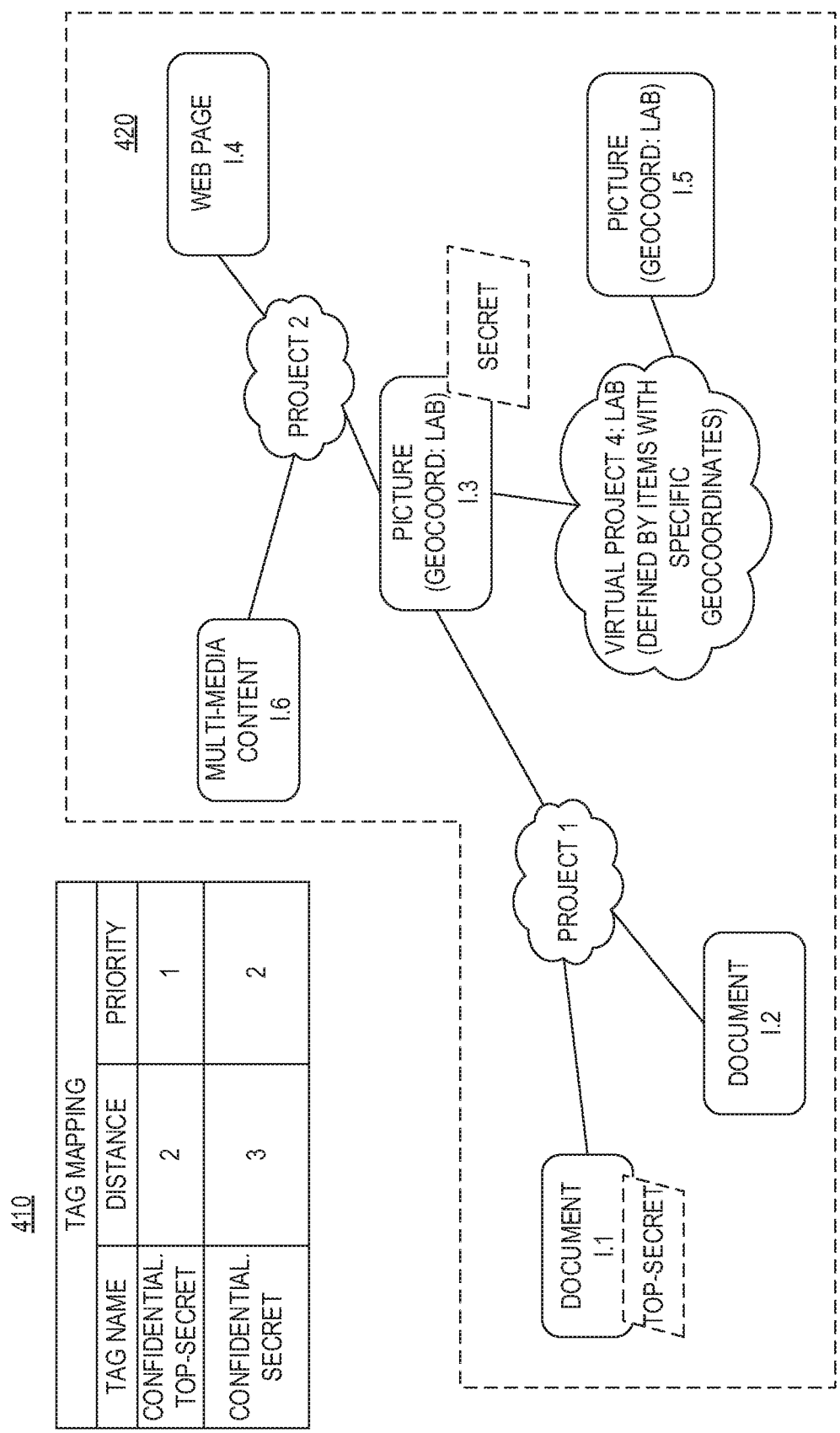
FIG. 4 is an example diagram illustrating an example of conflict resolution with auto-propagation tags in a propagation operation in accordance with one illustrative embodiment.

FIG. 4 is an example diagram illustrating an example operation of conflict resolution with auto-propagation tag propagation in accordance with one illustrative embodiment. As shown in the example of FIG. 4, a tag mapping data structure 410 is defined which, in addition to the tag name field and auto-propagation distance field, the tag mapping data structure 410 further includes a priority field that specifies the relative priorities of the auto-propagation metadata tags. In the depicted example, the metadata tag "confidential.top-secret" has an auto-propagation distance of 2 and a priority of 1 while metadata tag "confidential.secret" has an auto-propagation distance of 3 and priority of 2.

Based on the entries in the tag mapping data structure 410, the ontology 420 is traversed and metadata tags are propagated in a manner similar to that described above with regard to FIG. 3. However, in addition, conflicts between metadata tags are resolved in accordance with the relative priorities specified in the tag mapping data structure 410.

In the depicted example, content item i.1 has been tagged with the tag "top-secret," content item i.3 is tagged with the tag "secret", and all content items with a geolocation attribute of "geocoordinates:lab" are associated with the virtual project 4. In this example, due to the relative priorities of the metadata tags, the higher priority of the "top-secret" metadata tag causes lower priority conflicting tags to be overwritten, e.g., metadata tags of "secret" are overwritten with the "top-secret" metadata tag during the auto-propagation metadata tag propagation operation and conflict resolution. With that in mind, content item i.1 is already tagged with "top-secret" and content item i.2 receives the "secret" metadata tag by way of the propagation from content item i.3 to content item i.2 (distance 2 edges from content item i.3) and also receives the "top-secret" metadata tag due to the propagation from the content item i.1 (distance 2 edges from content item i.1). However, due to the relative priorities of these metadata tags which are determined to be conflicting with one another since they are of a same tag type or tag category of "confidential", the top-secret metadata tag is maintained and the secret metadata tag is discarded, i.e. top-secret overwrites secret. The content items i.4, i.5, and i.6 each receive the "secret" metadata tag propagated to them from content item i.3. Since the propagation takes part at the publishing step the published version of content item i.3 will not have the tag "secret" anymore because it has been overwritten by the tag "top-secret" as outlined above. The authoring version of content item i.3 will still have the tag "secret". This allows the tag "secret" to be propagated to content items i.4, i.5 and i.6. The tag propagation process is based on the authoring—the unpublished version of the content item. In search results only published versions of content items are used to generate the search results.

Figure 6:
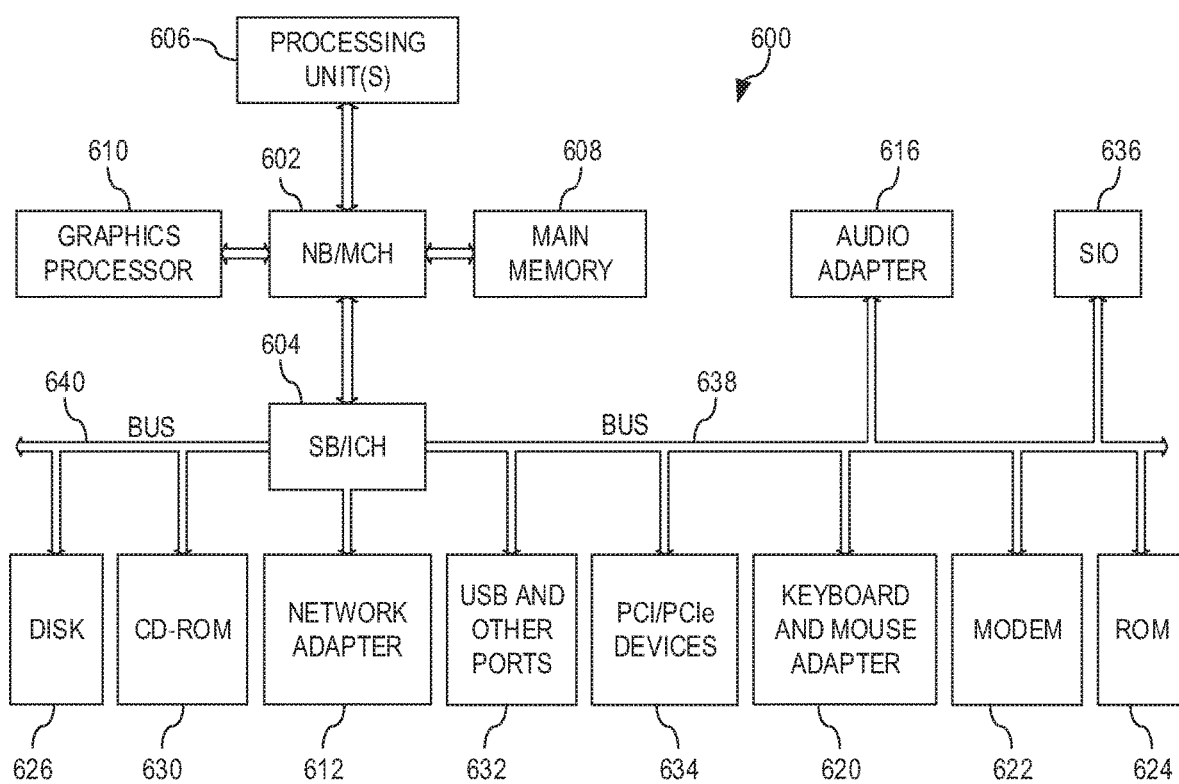
FIG. 6 is an example block diagram of a computing device in which aspects of the illustrative embodiments may be implemented.

From the above description, it should be appreciated that the illustrative embodiments may be utilized in many different types of data processing environments, a primary embodiment being in a distributed data processing environment in which the content management system (CMS) is provided on one or more server computing systems and accessible via one or more data networks by one or more end users via their client computing devices. In order to provide a context for the description of the specific elements and functionality of the illustrative embodiments, FIGS. 5 and 6 are provided hereafter as example environments in which aspects of the illustrative embodiments may be implemented. It should be appreciated that FIGS. 5 and 6 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, servers 504A-D are connected to network 502 along with storage unit 506. In addition, clients 510, 512, and 514 are also connected to network 502. These clients 510, 512, and 514 may be, for example, personal computers, network computers, or the like. In the depicted example, one or more of servers 504A-D provide data, such as boot files, operating system images, and applications to the clients 510, 512, and 514. Clients 510, 512, and 514 are clients to servers 504A-D in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

As shown in FIG. 5, one or more of the computing devices, e.g., server 504A, may be specifically configured to implement a content management system 520 which is augmented to include the modified authoring tool 530, the publishing tool 540, and an auto-propagation tagging engine 550 with computing logic that performs operations for facilitating auto-propagation propagation of metadata tags between content items and/or projects using a content item ontology data structure and tag mapping data structure, as described previously with regard to one or more of the illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 504A, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates auto-propagation propagation of metadata tags from content items and/or projects to other related content items and/or projects as indicated in a content item ontology, and based on auto-propagation distance properties defined in association with the auto-propagation metadata tags.

It should be appreciated that while FIG. 5 shows a single computing device, e.g., server 504A, being configured to provide such mechanisms, the illustrative embodiments are not limited to such. Rather, in some illustrative embodiments, the logic, engines, and resources utilized to provide the functionality of the auto-propagation tagging mechanisms of the illustrative embodiments may be distributed across multiple computing devices, e.g., a plurality of servers 504A-504D. In some illustrative embodiments, the content management system and/or auto-propagation tagging engine employed by the content management system may be implemented as a cloud service in a cloud computing environment, for example.

As noted above, the mechanisms of the illustrative embodiments utilize specifically configured computing devices, or data processing systems, to perform the operations for auto-propagation metadata tag propagation. These computing devices, or data processing systems, may comprise various hardware elements which are specifically configured, either through hardware configuration, software configuration, or a combination of hardware and software configuration, to implement one or more of the systems/subsystems described herein. FIG. 6 is a block diagram of just one example data processing system in which aspects of the illustrative embodiments may be implemented. Data processing system 600 is an example of a computer, such as server 504 in FIG. 5, in which computer usable code or instructions implementing the processes and aspects of the illustrative embodiments of the present invention may be located and/or executed so as to achieve the operation, output, and external effects of the illustrative embodiments as described herein.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 600.

As a server, data processing system 600 may be, for example, an IBM eServer™ System p° computer system, Power™ processor based computer system, or the like, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

As mentioned above, in some illustrative embodiments the mechanisms of the illustrative embodiments may be implemented as application specific hardware, firmware, or the like, application software stored in a storage device, such as HDD 626 and loaded into memory, such as main memory 608, for executed by one or more hardware processors, such as processing unit 606, or the like. As such, the computing device shown in FIG. 6 becomes specifically configured to implement the mechanisms of the illustrative embodiments and specifically configured to perform the operations and generate the outputs described herein with regard to the content management system and/or auto-propagation tagging engine.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

Figure 7:
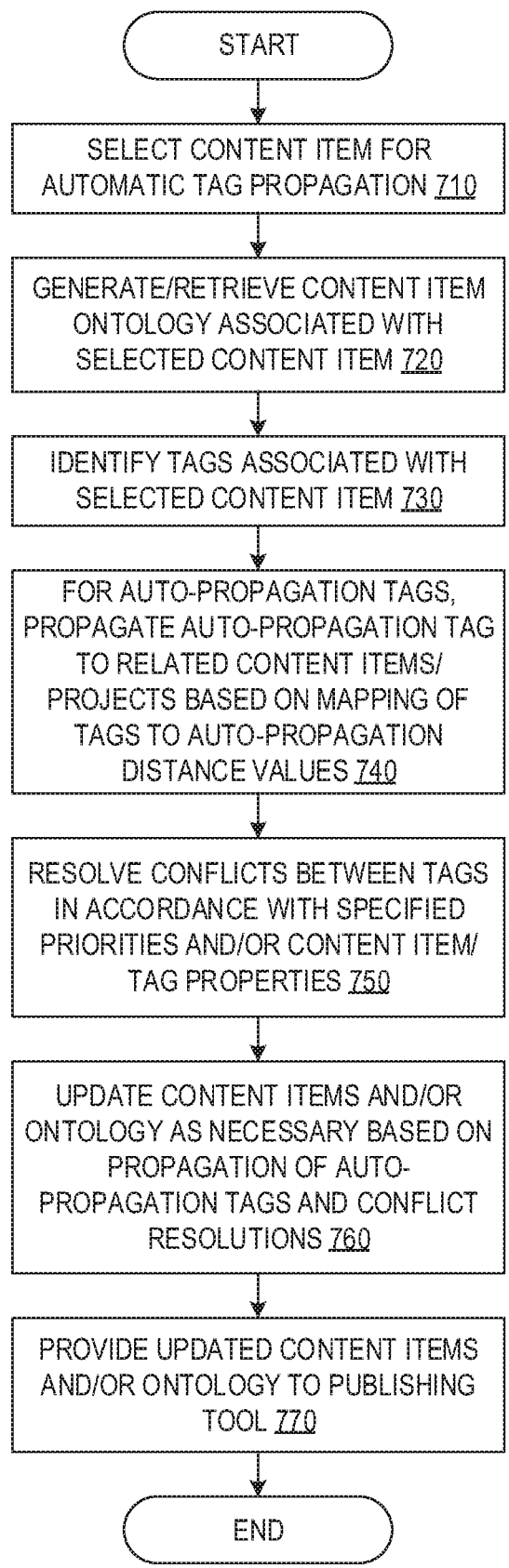
FIG. 7 is a flowchart outlining an example operation for performing auto-propagation tagging of content items in accordance with one illustrative embodiment.

FIG. 7 is a flowchart outlining an example operation for performing auto-propagation tagging of content items in accordance with one illustrative embodiment. As shown in FIG. 7, the operation starts with the selection of a content item for auto-propagation tag propagation (step 710). A content item ontology data structure corresponding to the selected content item is then generated (or retrieved if one has been previously generated) (step 720). The metadata tags associated with the selected content item are identified in the metadata of the content item (step 730). For auto-propagation tags associated with the selected content item, as specified in a tag mapping data structure, the auto-propagation tags are propagated to related content items/projects based on a mapping of the tags to corresponding auto-propagation distance values (step 740). During the propagation, conflicts between metadata tags are identified and resolved in accordance with priorities and/or content item/tag properties (step 750). The content items and/or ontology are updated as necessary based on the propagation of the auto-propagation tags and conflict resolutions (step 760). The updated content items and/or ontology are provided to the publishing tool of the content management system for publication of content items to downstream computing devices (step 770). The operation then terminates. It should be appreciated that while FIG. 7 shows the operation terminating, the operation may be repeated for each content item in the ontology, which then becomes the selected content item, such that all auto-propagation metadata tags of each of the content items and/or projects are properly propagated to related content items and/or projects.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement a content management system comprising an auto-propagation tagging engine, the method comprising:

retrieving, by the auto-propagation tagging engine, for a selected first content item in a content item ontology data structure, an auto-propagation metadata tag associated with the selected first content item;

identifying, by the auto-propagation tagging engine, for the auto-propagation metadata tag, a corresponding auto-propagation distance property stored in a corresponding entry, associated with the auto-propagation metadata tag, in an auto-propagation metadata tag mapping data structure;

propagating, by the auto-propagation tagging engine, the auto-propagation metadata tag to a related second content item based on a traversal of the content item ontology data structure starting with the selected first content item, wherein the related second content item is within a distance, in the content item ontology data structure, of the selected first content item corresponding to the auto-propagation distance property;

modifying, by the auto-propagation tagging engine, the related second content item to include the auto-propagation metadata tag in the content of metadata associated with the related second content item to generate an updated content item; and outputting, by the auto-propagation tagging engine, the updated content item to a publishing tool of the content management system for publication of the updated content item to a downstream computing system.

2. The method of claim 1, further comprising:

generating, by content item ontology logic of the content management system, the content item ontology data structure, wherein the content item ontology data structure comprises a graph having nodes representing content items and edges representing relationships between content items, wherein one or more of the content items have assigned auto-propagation metadata tags associated with the one or more content items.

3. The method of claim 2, wherein generating the content item ontology data structure comprises automatically executing content item grouping logic on a plurality of content items to generate a plurality of content item groups, wherein each content item group in the plurality of content item groups comprises content items having a same attribute and an automatically generated relationship to the content item group, and wherein the content item group is represented in the content item ontology data structure as a content item group node and the content items in the content item group are represented as content item nodes with edges linking the content item nodes to their associated content item group node.

4. The method of claim 3, wherein generating the content item ontology data structure comprises receiving manual user specification of relationships between content item nodes, wherein the manual user specification overrides the automatically executed content item grouping logic in any conflicts between the manual user specification of relationships and the automatically generated relationships.

5. The method of claim 1, wherein the corresponding entry in the auto-propagation metadata tag mapping data structure comprises a tag type, wherein propagating the auto-propagation metadata tag to the related second content item further comprises resolving conflicts between metadata tags associated with the related second content item based on the tag type.

6. The method of claim 5, wherein resolving conflicts between metadata tags comprises:

identifying a conflict between metadata tags in response to detecting that the related second content item has two or more metadata tags of a same tag type.

7. The method of claim 5, wherein the corresponding entry in the auto-propagation metadata tag mapping data structure comprises a metadata tag priority value, and wherein resolving conflicts between metadata tags associated with the related second content item which have a same tag type comprises resolving the conflict based on the metadata tag priority values associated with the conflicting metadata tags associated with the related second content item.

8. The method of claim 5, wherein resolving conflicts between metadata tags associated with the related second content item comprises comparing properties of the selected first content item and the related second content item and selecting whether to maintain a pre-existing metadata tag associated with the related second content item prior to the propagating, or replacing the pre-existing metadata tag with the propagated auto-propagation metadata tag based on results of the comparing.

9. The method of claim 1, wherein propagating the auto-propagation metadata tag to the related second content item further comprises propagating the auto-propagation metadata tag to each content item node in the content item ontology data structure that is within a distance, in the content item ontology data structure, corresponding to the auto-propagation distance property, from a content item node corresponding to the selected first content item.

10. The method of claim 1, wherein the auto-propagation tagging engine executes in parallel with an authoring tool and a publishing tool of a content management system executing on the data processing system.

11. A computer program product comprising a computer readable storage medium having a computer readable program stored therein, wherein the computer readable program, when executed on a computing device, causes the computing device to:
retrieve, for a selected first content item in a content item ontology data structure, an auto-propagation metadata tag associated with the selected first content item;
identify, for the auto-propagation metadata tag, a corresponding auto-propagation distance property stored in a corresponding entry, associated with the auto-propagation metadata tag, in an auto-propagation metadata tag mapping data structure;
propagate the auto-propagation metadata tag to a related second content item based on a traversal of the content item ontology data structure starting with the selected first content item, wherein the related second content item is within a distance, in the content item ontology data structure, of the selected first content item corresponding to the auto-propagation distance property;
modify the related second content item to include the auto-propagation metadata tag in the content of metadata associated with the related second content item to generate an updated content item; and
output the updated content item to a publishing tool of the content management system for publication of the updated content item to a downstream computing system.

12. The computer program product of claim 11, wherein the computer readable program further causes the computing device to:
generate the content item ontology data structure, wherein the content item ontology data structure comprises a graph having nodes representing content items and edges representing relationships between content items, wherein one or more of the content items have assigned auto-propagation metadata tags associated with the one or more content items.

13. The computer program product of claim 12, wherein generating the content item ontology data structure comprises automatically executing content item grouping logic on a plurality of content items to generate a plurality of content item groups, wherein each content item group in the plurality of content item groups comprises content items having a same attribute and an automatically generated relationship to the content item group, and wherein the content item group is represented in the content item ontology data structure as a content item group node and the content items in the content item group are represented as content item nodes with edges linking the content item nodes to their associated content item group node.

14. The computer program product of claim 13, wherein generating the content item ontology data structure comprises receiving manual user specification of relationships between content item nodes, wherein the manual user specification overrides the automatically executed content item grouping logic in any conflicts between the manual user specification of relationships and the automatically generated relationships.

15. The computer program product of claim 11, wherein the corresponding entry in the auto-propagation metadata tag mapping data structure comprises a tag type, wherein propagating the auto-propagation metadata tag to the related second content item further comprises resolving conflicts between metadata tags associated with the related second content item based on the tag type.

16. The computer program product of claim 15, wherein resolving conflicts between metadata tags comprises:
identifying a conflict between metadata tags in response to detecting that the related second content item has two or more metadata tags of a same tag type.

17. The computer program product of claim 15, wherein the corresponding entry in the auto-propagation metadata tag mapping data structure comprises a metadata tag priority value, and wherein resolving conflicts between metadata tags associated with the related second content item which have a same tag type comprises resolving the conflict based on the metadata tag priority values associated with the conflicting metadata tags associated with the related second content item.

18. The computer program product of claim 15, wherein resolving conflicts between metadata tags associated with the related second content item comprises comparing properties of the selected first content item and the related second content item and selecting whether to maintain a pre-existing metadata tag associated with the related second content item prior to the propagating, or replacing the pre-existing metadata tag with the propagated auto-propagation metadata tag based on results of the comparing.

19. The computer program product of claim 11, wherein propagating the auto-propagation metadata tag to the related second content item further comprises propagating the auto-propagation metadata tag to each content item node in the content item ontology data structure that is within a distance, in the content item ontology data structure, corresponding to the auto-propagation distance property, from a content item node corresponding to the selected first content item.

20. An apparatus comprising:
a processor; and
a memory coupled to the processor, wherein the memory comprises instructions which, when executed by the processor, cause the processor to:
retrieve, for a selected first content item in a content item ontology data structure, an auto-propagation metadata tag associated with the selected first content item;
identify, for the auto-propagation metadata tag, a corresponding auto-propagation distance property stored in a corresponding entry, associated with the auto-propagation metadata tag, in an auto-propagation metadata tag mapping data structure;
propagate the auto-propagation metadata tag to a related second content item based on a traversal of the content item ontology data structure starting with the selected first content item, wherein the related second content item is within a distance, in the content item ontology data structure, of the selected first content item corresponding to the auto-propagation distance property;
modify the related second content item to include the auto-propagation metadata tag in the content of metadata associated with the related second content item to generate an updated content item; and
output the updated content item to a publishing tool of the content management system for publication of the updated content item to a downstream computing system.

* * * * *